Sept. 20, 1960    O. W. UFERT    2,953,067
MACHINE FOR GENERATING GEARS
Filed Aug. 9, 1954    3 Sheets-Sheet 1
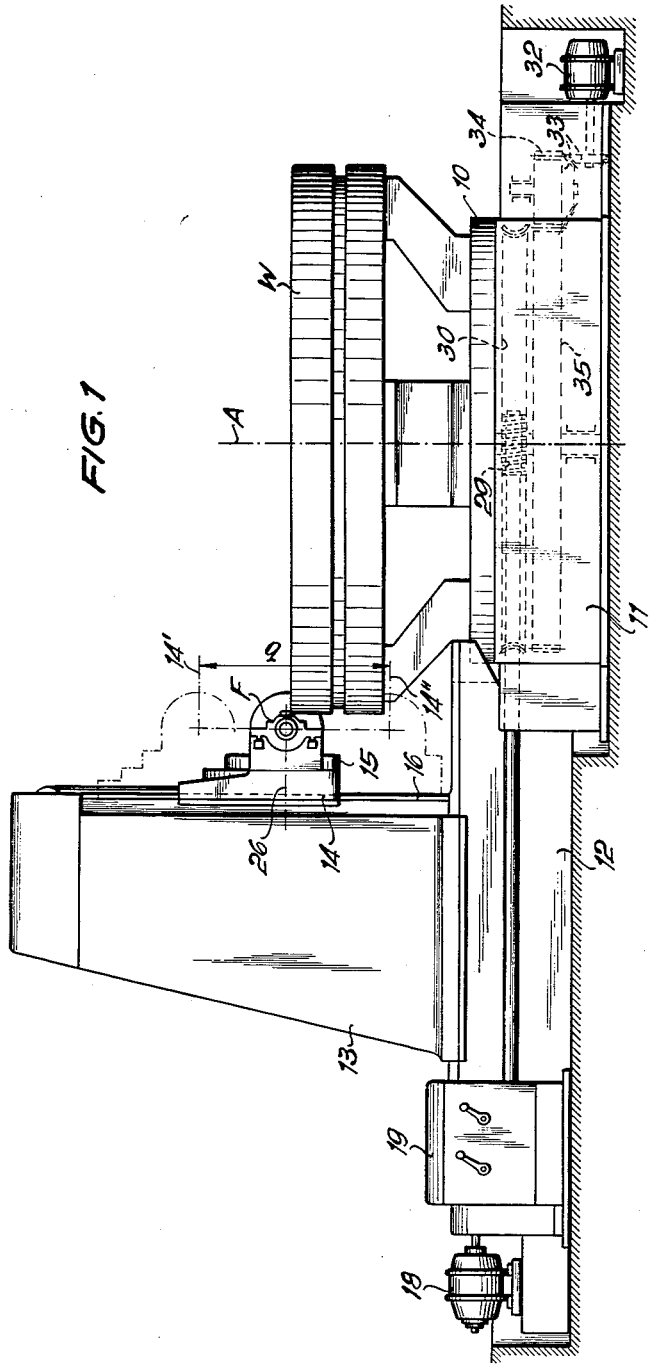
INVENTOR
Otto Wilhelm Ufert
By
Patent Agent

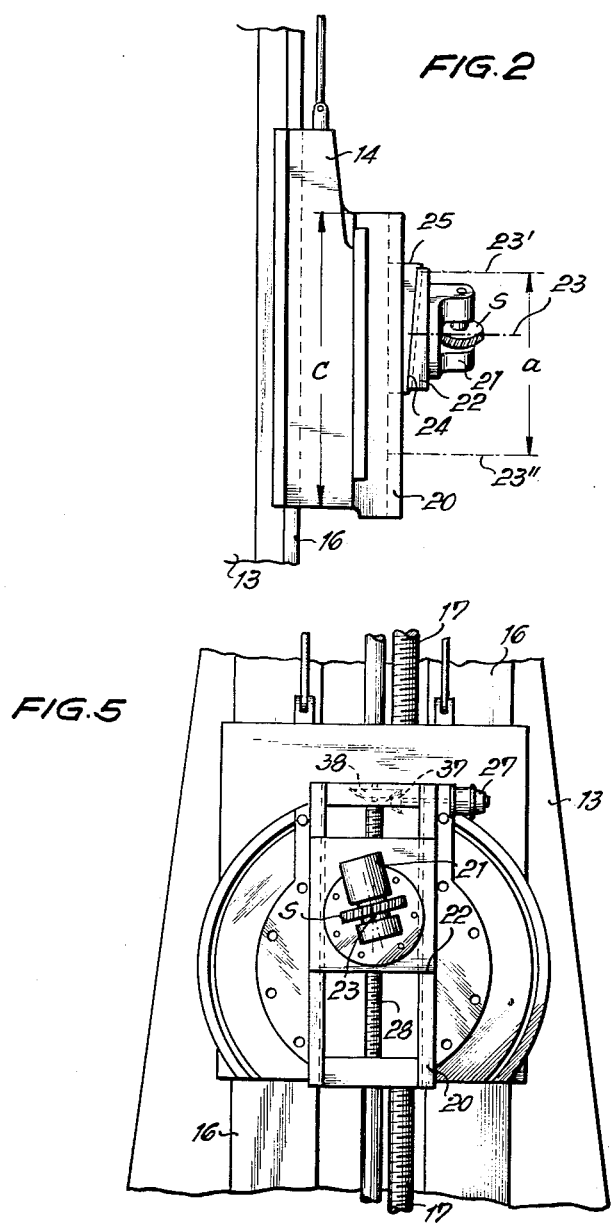

Sept. 20, 1960  O. W. UFERT  2,953,067
MACHINE FOR GENERATING GEARS
Filed Aug. 9, 1954  3 Sheets-Sheet 3
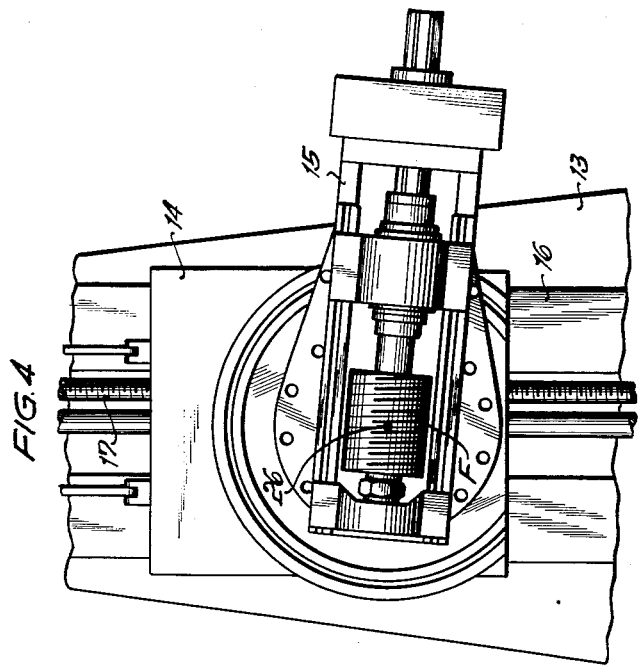
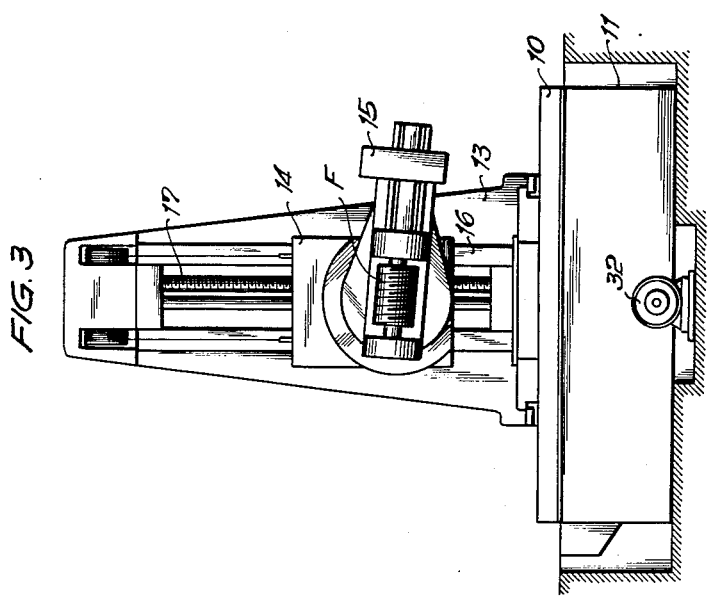
INVENTOR
Otto Wilhelm Ufert
By Walter Behn
Patent Agent United States Patent Office 2,953,067
Patented Sept. 20, 1960

2,953,067

MACHINE FOR GENERATING GEARS

Otto Wilhelm Ufert, Dusseldorf-Oberkassel, Germany, assignor to Schiess Aktiengesellschaft, Dusseldorf-Oberkassel, Germany Filed Aug. 9, 1954, Ser. No. 448,674

Claims priority, application Germany Aug. 12, 1953

8 Claims. (Cl. 90—1.6)

The present invention relates to a machine for producing gears. Such machines have been provided with means for mounting a swivel-type shaving head on a plate, the top portion of which is interchangeable, the shaving head being radially adjustable in relation to the work piece. This is very expedient inasmuch as the top part of the tool support of a gear hobbing machine can always be swiveled around an axis which is vertical to the axis of work. Therefore, the means for swivelling the shaving head, i.e. the circular guideways, the means for centering and the fastening members to be arranged in the annular grooves are already present. In addition, thereto, attachments are also avilable which permit a power operated movement of the plate in the direction of the axis of the work piece, which usually are a guideway on the column on which the plate moves in longitudinal direction, and a screw spindle with nut, the axis of which is parallel to the axis of the work piece. Therefore, a gear hobbing machine usually incorporates already all such features as are required to permit the shaving head to perform its movements and to enable it to be accurately set relative to the work piece.

The hobbing feed screw spindle and the guideway on the column for the plate may, however, be regarded to be two of the most important machine members which will greatly influence the accuracy of the work since any inaccuracy in the pitch of the feed screw will have some unfavorable effect on the accuracy of helical gears to be cut in conformity therewith. Any partial, unilateral or uneven wear of the plate guideway will result in errors in the pitch of the work gear and also in the longitudinal direction, which will at least be as big as the error in the guideway since, when hobbing, the play between guideway and plate will result in vibrations which will still be increased at a certain resonance.

An object of this invention consists in some further improvement and development of machines for shaving the flanks of gear teeth by means of a gear-like cutter on a gear hobber. This object has been materialized according to the present invention by mounting on the tool carriage or support a swivel-type shaving head in lieu of the hobbing head in such a manner that the shaving head is radially adjustable in relation to the work gear and is vertically movable on a guideway parallel to the hobbing feed guideway, so that the shaving head can be moved in the direction of the axis of the work piece, in two ways, namely first by moving the shaving head on the shaving head guideway and secondly, by moving the tool support on the hobbing feed guideway.

It is also an object of this invention to limit the stroke of the shaving head on the shaving head guideway over the stroke of the tool saddle on the hobbing feed guideway. The shaving head guideway is supported on the tool support to such an extent that even with the shaving head in its end positions, no tilting forces whatsoever resulting from the shaving pressure will act on the attachment. Due to a special design, the shaving head can be moved by means of a shaving feed gear unit which is fully independent of the hobbing feed, and the shaving feed gearing can be driven by a separate motor which is independent of the hobbing feed drive.

Due to the design of the machine according to the invention, no wear at all will occur at the hobbing feed screw and hobbing feed guideway while shaving (these two machine parts being most important for an accurate operation of the machine when hobbing the gears) since the tool support will not move at all when shaving. Thus the vibrations of the tool support in case of an unevenly worn hobbing feed guideway and the much feared resonance vibrations are eliminated. In addition thereto, the tool support is clamped to the guideway so that it is practically integral with the column.

Due to the fact that the tool support is stationary during the shaving operation, it is merely necessary to move the relatively small and light members of the shaving attachment in the direction of the work axis which will require a small feed drive only. The feed motor for the shaving attachment is, therefore, much smaller, lighter and thus more economical than the heavy saddle feed motor with its high power consumption. The invention is applicable without necessitating any change in the column of the gear hobber, the tool support and all feed and drive elements for the support, thereby avoiding the high cost of manufacturing the large and heavy machine parts required in case of a dual-type machine or if the standard machine is converted into a gear hobber with dual drive for the support. In accordance with the invention, the guideway of the shaving attachment may also be kept shorter than the hobbing feed guideway as, in spite of its shorter guideway, the shaving head can be raised and lowered to any height of the work gear due to the two movements described above. Due to the fact that according to the invention, the shaving attachment can be brought to any height together with the tool support and that only the shaving feed motion proper is performed on the guideway of the attachment, the guideway can be utilized to its full length and even in the case of narrow-faced gears uneven wear is avoided if the support is gradually lowered or raised on the hobbing feed guideway, thus altering the position of that portion of the shaving head guideway on which the shaving head moves to and fro when shaving the gear.

The invention is illustrated by way of example in connection with the accompanying drawings, in which Fig. 1 shows a diagrammatic side view of a gear hobber with the work gear clamped in position;

Fig. 2 shows on a larger scale than that of Fig. 1 the side view of a shaving attachment mounted in conformity with the present invention on the tool support of the gear hobber in lieu of the hobbing head.

Fig. 3 shows the front view of a gear hobber without workpiece;

Fig. 4 shows an enlarged view of a detail of Fig. 3;

Fig. 5 shows the front view of a shaving attachment mounted on the tool support in lieu of the hobbing head.

As shown in Fig. 1, the gear blank W is clamped on the table 10 of a gear hobbing machine. The table 10 rotates on the base 11. The base 11 is connected to the bed 12 of the machine, the bed carrying the column 13 which is radially adjustable in relation to the gear blank W to be machined. The column 13 is provided with a vertical hobbing feed guideway 16 on which the tool carriage or support 14 moves parallel to the axis A of the work gear W. A removable hobbing head 15 with the cutter F is mounted on the tool support 14. When raising or lowering the support 14, both the hobbing head 15 and the tool support 14 will perform the hobbing feed motion in the direction of axis A of work gear W, so that when hobbing, the tooth spaces are gradually cut on the entire face width of the gear blank, finally producing the gear.

The hobbing head 15 is mounted on the tool support 14 and can be swiveled around the horizontal axis 26 so that the correct intersecting angle between axis of cutter and axis of work piece may be set when cutting spur gears with worm-type hobs as well as to enable helical gears to be cut, to which end the hobbing head 15 must be swivelable so as to be able to be set to the respective angle conforming to the helix angle of the work gear.

The hobbing feed of the hobbing head 15 on the hobbing feed guideway 16 is effected by means of a screw spindle 17 inside the column 13 and a screw nut (not shown) on the tool support 14. The feed is derived from the main motor 18 through various gearing elements which are not shown in detail and which are mainly accommodated inside the gear box 19.

After the hobbing operation has been completed, gear W remains clamped to the table 10 for shaving the teeth. The hobbing head 15 only is removed and replaced by a guideway head 20 (Figs. 2 and 5) for the shaving head 21 which is screwed on to the tool support 14 in a position parallel to the hobbing feed guideway 16, so that the work gear W can be shaved on the gear hobber immediately after hobbing.

The shaving head 21 carries the gear-like rotary shaving tool S as in conventional gear shaving machinery without any separate drive, since it will rotate due to being in mesh with the revolving gear W which is to be shaved. The shaving head 21 can be swiveled on a setting slide 22 around an axis 23 which lies in about the center of the rotary cutter. By moving the setting slide 22 on an inclined guideway 24 for tool setting purposes, the head 21 can be radially adjusted in relation to the work gear W. The inclined guideway 24 is arranged on the top surface of a shaving slide 25 which moves on the shaving head guideway 20.

The top and bottom position of the swivel axis 23 of the shaving head 21 is shown by dot dash lines 23', 23'' in Fig. 2. The maximum travel of the shaving head 21 on the shaving head guideway 20 is marked a and is smaller than travel b of tool support 14 on hobbing feed guideway 16, the end positions 14', 14'' of the support being shown in Fig. 1 by dot dash lines. The shaving head guideway 20 is supported on the tool support 14 over such a length c that the shaving pressure which is approximately in the cutter center cannot produce any tilting forces upon the shaving head 21, the setting slide 22 and the shaving head guideway 20. The shaving head 21 is moved on the shaving head guideway 20 by means of the shaving slide 25 through a small motor 27 (Fig. 5) which is preferably mounted on top of the shaving head guideway 20 and which operates the shaving head 21 independently of the hobbing feed, through a bevel gear driven reduction gearing 37, 38 and a screw spindle 28 (Fig. 5).

While for cutting gears the table 10 is rotated slowly and steadily or step by step in the well-known manner through an index worm gearing 29, 30 (Fig. 1), the worm 29 is brought out of mesh with the worm wheel 30 in case of shaving and the table 10 is driven by a powerful motor 32 (provided for table drive only) through the gear unit 33, 34, 35 at such speeds as are required to give the work gear W to be shaved a circumferential speed of approximately 100 m./min. The tangents of the true involute of the tooth profile, which are positively produced when hobbing will be evenly removed on all flanks, since the gear has not been reset after hobbing and the tooth flanks will therefore still run concentrically with the same accuracy as was obtained during the hobbing operation. Any other errors in the gear which were caused by the hobbing operation will be evenly reduced on all tooth flanks when having the teeth, the tooth flanks are smoothed over the entire circumference, the surface becoming denser and thus more resistant to wear. Finally the output of the machine can be increased when hobbing, as the hobbing feed may be increased. This is due to the fact that with gears which are not finished by shaving, the feed rate permissible is dependent upon the condition, i.e. roughness, of the surface which is produced by the hobbing feed. Subsequent shaving of the work gear on the same machine without resetting the job using an attachment which prevents an additional or unequal wear of the machine, will smooth out and eliminate respectively such roughness on the entire face width, so that the hobbing feed may be increased. In this connection it may be mentioned that the shaving slide 25 is preferably fitted with adjustable gibs to ensure a running of the slide on the guideway 20 free from any play. In addition thereto, the table track should preferably be of V-shape to ensure a true running of the table even at the high speeds necessary when shaving.

The application of the invention is not limited to the example described, but can also be made use of in gear hobbing machines with fixed column and moving table or in such machines where the work gear performs the hobbing feed motion.

What I claim is:

1. In a machine for producing gears by hobbing and subsequent shaving: a rotatable table for receiving a gear blank to be hobbed, supporting means supporting said table, a vertical column movable selectively toward and away from the axis of rotation of said table along a vertical plane passing through said column and said axis, said column being provided with vertical guiding means, a tool slide reciprocably mounted on said guiding means for movement parallel to the axis of rotation of said table, a first drive drivingly connected to said tool slide for reciprocating the same, an auxiliary guide member detachably connected to said tool slide, an auxiliary slide slidably mounted on said auxiliary guide member for reciprocation thereon along a path parallel to the axis of rotation of said table, a second drive independent of said first drive for reciprocating said auxiliary slide, said auxiliary slide being adapted to receive and support a shaving head, said tool slide being adapted to receive a hobbing head when said auxiliary guide member with the auxiliary slide thereon is removed from said tool slide, and driving means including a first motor and a dividing worm wheel for rotating said table at a first speed for hobbing, said driving means being adapted selectively to be drivingly disconnected from said table, and a second motor independent of said first motor and adapted selectively to be drivingly connected to said table for driving said table at a second elevated speed for shaving.

2. An arrangement according to claim 1, in which the auxiliary guide member is supported by said tool slide over an area sufficient to prevent said auxiliary guide member from exerting any tilting forces on said tool slide.

3. An arrangement according to claim 1, in which the maximum stroke of said auxiliary slide is limited over the maximum stroke of said tool slide.

4. In a machine for producing gears by hobbing and subsequent shaving: a rotatable table for receiving a gear blank to be hobbed, supporting means supporting said table, a vertical column movable selectively toward and away from the axis of rotation of said table along a vertical plane passing through said column and said axis, said column being provided with vertical guiding means, a tool slide reciprocably mounted on said guiding means, first motor means, means drivingly connecting said first motor means to said tool slide and said table for respectively reciprocating said tool slide along a path parallel to the axis of rotation of said table and for rotating said table at a first speed for hobbing, said first motor means being adapted selectively to be drivingly disconnected from said table, said tool slide being arranged selectively and detachably to receive a hobbing head and in substitution therefor an auxiliary guide member with an auxiliary slide for receiving a shaving head, said tool slide also being adapted to be stationarily connected to said column, second motor means independent of said first motor means and supported by said auxiliary guide member for driving said auxiliary slide, and third motor means independent of said first and second motor means and adapted selectively drivingly to be connected to said table for driving the same at a second speed higher than said first speed for carrying out a shaving operation.

5. A shaving unit for use in connection with a hobbing machine having a base with a bed, a table rotatably mounted on said base for supporting a gear blank to be hobbed, a column slidable on said bed for adjustment relative to said table, a tool support movably mounted on said column in a direction substantially parallel to the axis of rotation of said table, and spindle means for effecting the hobbing feed of said tool support during the hobbing operation, said shaving unit including: a main support detachably connectable to said tool support and provided with guiding surfaces substantially parallel to the axis of rotation of said table, a slide slidable on the guiding surfaces of said main support, a shaving head carried by said slide, said slide and said shaving head including means for bringing about movement of said shaving head in a direction perpendicular to the path of movement of said slide on said main support, driving means carried by said shaving head for actuating the latter to bring about a shaving feed movement independent of the actuation of said spindle means, and gear means drivingly connecting said driving means to said slide for actuating the same.

6. An arrangement according to claim 5, in which said driving means includes a feed spindle, and motor means drivingly connected to said slide for feeding the same during a shaving operation.

7. An arrangement according to claim 5, in which said slide is supported by said main support over an area sufficient to prevent said slide from exerting a tilting force on said main support with regard to said tool support.

8. An arrangement according to claim 5, which includes means for limiting the maximum stroke of said slide over the maximum stroke of said support.

References Cited in the file of this patent

UNITED STATES PATENTS

| | | |
|---|---|---|
| 1,211,183 | Kulenkampff | Jan. 2, 1917 |
| 2,227,491 | Drummond | Jan. 7, 1941 |
| 2,383,753 | Wallace | Aug. 28, 1945 |
| 2,452,520 | Falk et al. | Oct. 26, 1948 |
| 2,504,968 | Eklund | Apr. 25, 1950 |
| 2,553,984 | Siekmann | May 22, 1951 |
| 2,556,142 | McLeod | June 5, 1951 |
| 2,556,143 | McLeod | June 5, 1951 |
| 2,556,318 | Cooper | June 12, 1951 |
| 2,749,802 | Carlsen | June 12, 1956 |

FOREIGN PATENTS

| | | |
|---|---|---|
| 128,205 | Sweden | May 9, 1950 |
| 880,843 | Germany | June 25, 1953 |